(12) United States Patent
Rock

(10) Patent No.: US 8,348,242 B2
(45) Date of Patent: Jan. 8, 2013

(54) POST AND RAIL COUPLING SYSTEM

(76) Inventor: Roger Rock, Lake Worth, FL (US)

( * ) Notice: Subject to any disclaimer, the term of this patent is extended or adjusted under 35 U.S.C. 154(b) by 381 days.

(21) Appl. No.: 12/165,274

(22) Filed: Jun. 30, 2008

(65) Prior Publication Data

US 2009/0321703 A1 Dec. 31, 2009

(51) Int. Cl.
*B21F 27/00* (2006.01)
*E04H 17/16* (2006.01)

(52) U.S. Cl. .................... 256/22; 256/65.02; 256/65.12; 256/65.15; 256/DIG. 1

(58) Field of Classification Search .................... 256/22, 256/59, 65.02, 65.12, 65.14, 65.15, DIG. 1, 256/DIG. 5; 403/220, 223, 229, 325, 327; 248/156, 159, 530, 545, 549; 211/105.5, 211/105.6, 182, 204, 206; 312/111, 257.1, 312/265.1

See application file for complete search history.

(56) References Cited

U.S. PATENT DOCUMENTS

| | | | | |
|---|---|---|---|---|
| 358,819 | A * | 3/1887 | Power | 242/385.4 |
| 1,826,998 | A * | 10/1931 | Doddridge | 256/13.1 |
| 4,346,872 | A * | 8/1982 | Tornya | 256/65.02 |
| 4,377,275 | A * | 3/1983 | Faber et al. | 256/69 |
| 5,233,707 | A * | 8/1993 | Perkins | 5/8 |
| 5,238,321 | A * | 8/1993 | Jarjoura | 403/172 |
| 5,404,682 | A * | 4/1995 | West | 52/165 |
| 5,613,664 | A * | 3/1997 | Svalbe | 256/19 |
| 5,921,035 | A * | 7/1999 | Kempf | 52/157 |
| 6,290,212 | B1 * | 9/2001 | Bartel | 256/65.14 |
| 6,299,397 | B1 * | 10/2001 | Mengel | 411/24 |
| 6,341,752 | B1 * | 1/2002 | Green | 248/156 |
| 6,394,422 | B1 * | 5/2002 | Jones et al. | 256/65.01 |
| 6,568,658 | B2 * | 5/2003 | Strome | 256/65.14 |
| 6,758,460 | B1 * | 7/2004 | Driscoll et al. | 256/65.05 |
| 6,789,302 | B1 * | 9/2004 | Preta | 29/432 |
| 6,889,960 | B1 * | 5/2005 | Jones | 256/65.03 |
| 7,044,448 | B1 * | 5/2006 | Jones | 256/19 |
| 7,386,960 | B2 * | 6/2008 | Molteni | 52/238.1 |
| 7,762,533 | B2 * | 7/2010 | DeRogatis et al. | 256/67 |

FOREIGN PATENT DOCUMENTS

DE 3245770 A1 * 6/1984

* cited by examiner

*Primary Examiner* — Michael P Ferguson
*Assistant Examiner* — Nahid Amiri

(57) ABSTRACT

A plurality of similarly configured coupling component assemblies is provided. Each assembly includes a first coil spring and a second coil spring. Each coil spring is positioned in a hole. Each coil spring has an interior end of a reduced diameter with a fastener attaching the spring to the hole. Each coil spring has an exterior end extending a short distance outside of the hole. The exterior ends of adjacent opposing coil springs are adapted to interlock and join associated components of the system when rotated with respect to each other about a common axis of rotation. The coupling components also include a cylindrical rod with opposed ends within the opposing coil springs. Each rod has an axial length greater than the length of each coil spring and less than the axial length of two holes.

3 Claims, 3 Drawing Sheets

POST AND RAIL COUPLING SYSTEM

BACKGROUND OF THE INVENTION

1. Field of the Invention

The present invention relates to a post and rail coupling system and more particularly pertains to joining posts and like components with no external sign of coupling elements, the joining being in a safe, convenient and economical manner.

2. Description of the Prior Art

The use of coupling systems of known designs and configurations is known in the prior art. More specifically, coupling systems of known designs and configurations previously devised and utilized for the purpose of joining components through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 556,082 issued Mar. 10, 1896 to Boeddinghaus relates to a screw Fastener. U.S. Pat. No. 5,101,213 issued Mar. 31, 1992 to Harada relates to a Screw Type Coupling Device and an Antenna Installation Device Using the Same. Lastly, U.S. Pat. No. 5,639,195 Jun. 17, 1997 to Brabston relates to a Helical Panel Fastener.

While these devices fulfill their respective, particular objectives and requirements, the aforementioned patents do not describe a post and rail coupling system that allows for joining posts and like components with no external sign of coupling elements, the joining being in a safe, convenient and economical manner.

In this respect, the post and rail coupling system according to the present invention substantially departs from the conventional concepts and designs of the prior art, and in doing so provides an apparatus primarily developed for the purpose of joining posts and like components with no external sign of coupling elements, the joining being in a safe, convenient and economical manner.

Therefore, it can be appreciated that there exists a continuing need for a new and improved post and rail coupling system which can be used for joining posts and like components with no external sign of coupling elements, the joining being in a safe, convenient and economical manner. In this regard, the present invention substantially fulfills this need.

SUMMARY OF THE INVENTION

In view of the foregoing disadvantages inherent in the known types of coupling systems of known designs and configurations now present in the prior art, the present invention provides an improved post and rail coupling system. As such, the general purpose of the present invention, which will be described subsequently in greater detail, is to provide a new and improved post and rail coupling system and method which has all the advantages of the prior art and none of the disadvantages.

To attain this, the present invention essentially comprises a post and rail coupling system. First provided is a wooden base. The base has an upper horizontal surface. The upper surface has a plurality of cylindrical base holes. Each of the base holes has a common diameter. Each of the base holes has a common axial length. Each of the base holes has an interior closed end. Each of the base holes terminates at the interior closed end. The base holes are evenly spaced. The base holes are provided in a linear array.

A wooden hand rail is provided. The hand rail has a lower horizontal surface. The lower surface has a plurality of cylindrical rail holes. Each of the rail holes has a common diameter. The diameter of each of the rail holes is equal to the diameters of the base holes. Each of the rail holes has a common axial length. The length of each of the rail holes is equal to the axial lengths of the base holes. Each rail hole has an interior base closed end. Each of the rail holes terminates at the interior base closed end. The rail holes are evenly spaced. The spacing of the rail holes is equal to the spacing of the base holes. The rail holes are provided in a linear array. The hand rail is constructed of similarly configured segments. The hand rail has end faces. The end faces are provided in facing contact. Each of the end faces has a face hole. Each of the face holes has a common diameter. The diameter of each of the face holes is equal to the diameters of the base holes and rail holes. Each of the face holes has a common axial length. The length of each of the face holes is equal to the axial lengths of the base holes and rail holes. Each face hole has an interior rail closed end. Each of the face holes terminates at the interior rail closed end.

Further provided is a plurality of similarly configured wooden vertical posts. Each of the posts has a common length. Each of the posts has a horizontal upper end. Each of the posts has a horizontal lower end. Each of the ends has a post hole. Each of the post holes have a common diameter. The diameter of each of the post holes is equal to the diameters in the base holes and the rail holes. Each of the post holes has a common axial length. The length of each of the post holes is equal to the axial lengths in the base holes and the rail holes. Each of the post holes has an interior closed end. Each of the post holes terminates at the interior closed end.

Provided last is a plurality of similarly configured coupling component assemblies. Each assembly includes a first coil spring. Each assembly includes a second coil spring. Each coil spring is positioned in a hole. Each coil spring has an interior end. The interior end of the each coil spring has a reduced diameter. Each coil spring has a nail. The nail attaches the spring to the hole. Each coil spring has an exterior end. The exterior end extends a short distance outside of the hole. The exterior ends of adjacent opposing coil springs are adapted to interlock and join associated components of the system when rotated with respect to each other about a common axis of rotation. The coupling components also include a cylindrical rod. The rod has opposed ends within the opposing coil springs. Each rod has an axial length. The length of each rod is greater than the length of each coil spring and less than the axial length of two holes.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved post and rail coupling system which has all of the advantages of the prior art coupling systems of known designs and configurations and none of the disadvantages.

It is another object of the present invention to provide a new and improved post and rail coupling system which may be easily and efficiently manufactured and marketed.

It is further object of the present invention to provide a new and improved post and rail coupling system which is of durable and reliable constructions.

An even further object of the present invention is to provide a new and improved post and rail coupling system which is susceptible of a low cost of manufacture with regard to both materials and labor, and which accordingly is then susceptible of low prices of sale to the consuming public, thereby making such post and rail coupling system economically available to the buying public.

Even still another object of the present invention is to provide a post and rail coupling system for joining posts and like components with no external sign of coupling elements, the joining being in a safe, convenient and economical manner.

Lastly, it is an object of the present invention to provide a new and improved post and rail coupling system. A plurality of similarly configured coupling component assemblies is provided. Each assembly includes a first coil spring and a second coil spring. Each coil spring is positioned in a hole. Each coil spring has an interior end of a reduced diameter with a fastener attaching the spring to the hole. Each coil spring has an exterior end extending a short distance outside of the hole. The exterior ends of adjacent opposing coil springs are adapted to interlock and join associated components of the system when rotated with respect to each other about a common axis of rotation. The coupling components also include a cylindrical rod with opposed ends within the opposing coil springs. Each rod has an axial length greater than the length of each coil spring and less than the axial length of two holes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
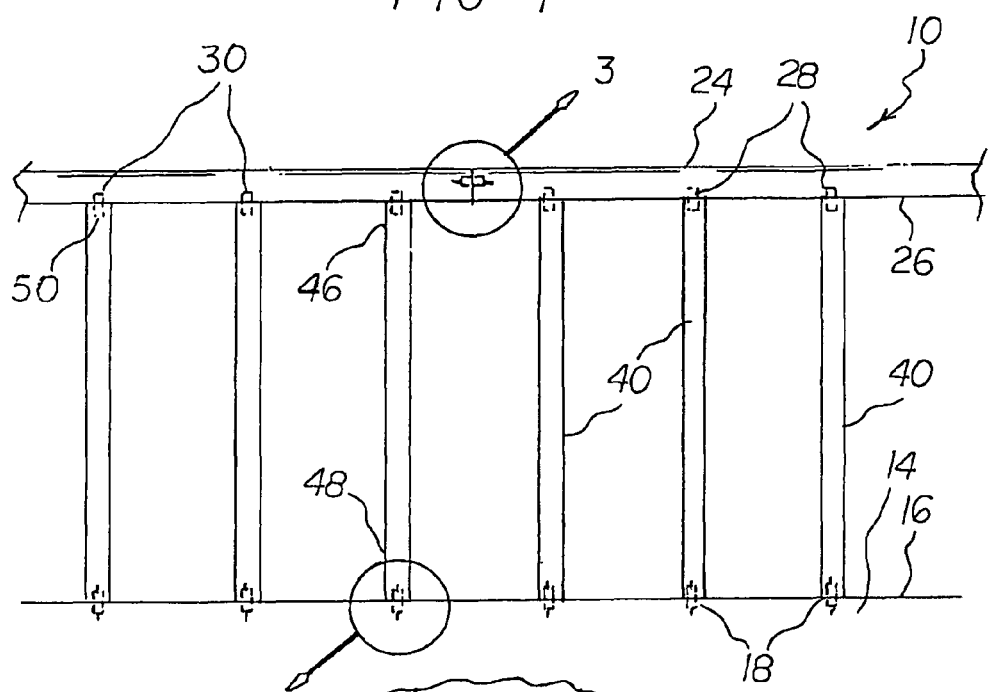
FIG. 1 is a front elevational view of a post coupling system constructed in accordance with the principles of the present invention.
Figure 2:
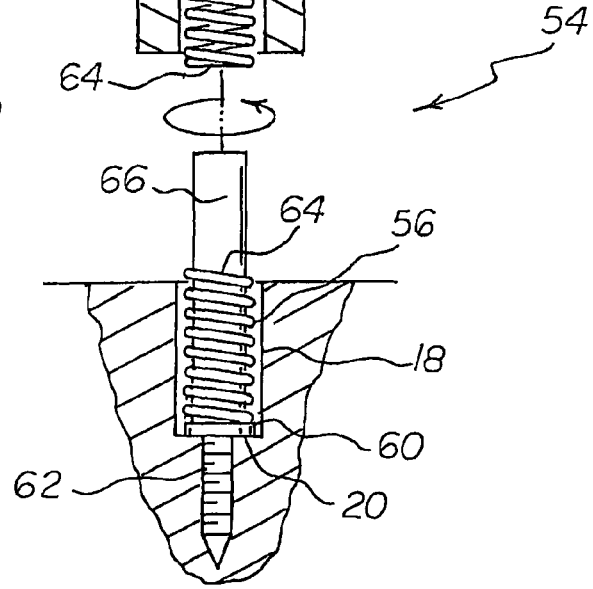
FIG. 2 is an enlarged exploded view taken at Circle 2 of FIG. 1.
Figure 3:
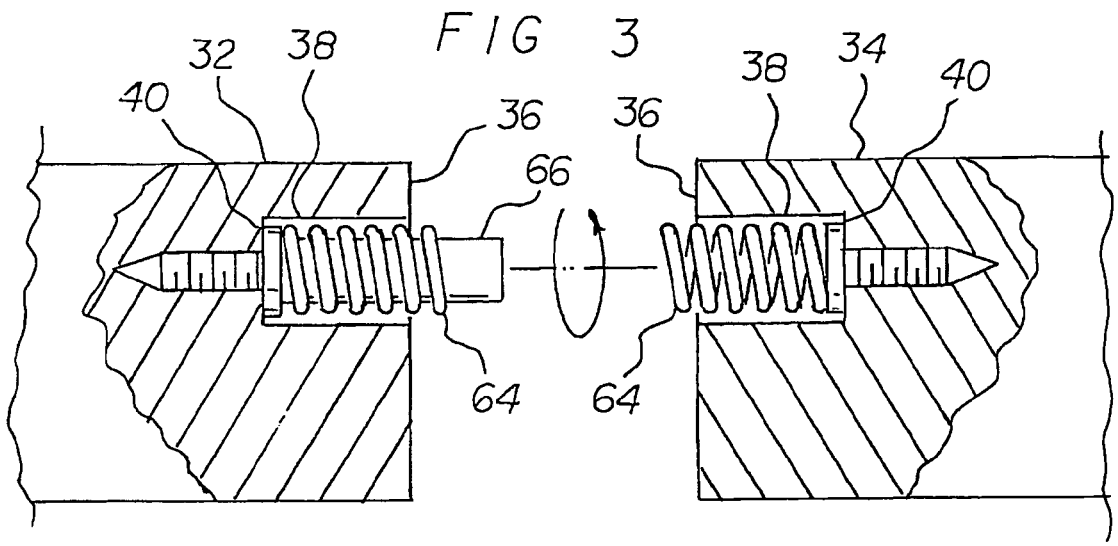
FIG. 3 is an enlarged exploded view taken at Circle 3 of FIG. 1.
Figure 4:
FIG. 4 is an enlarged front elevational view of one of the coil springs of the prior Figures.

With reference now to the drawings, and in particular to FIG. 1 thereof, the preferred embodiment of the new and improved post and rail coupling system embodying the principles and concepts of the present invention and generally designated by the reference numeral 10 will be described.

The present invention, the post and rail coupling system 10 is comprised of a plurality of components. Such components in their broadest context include a plurality of similarly configured coupling component assemblies. Such components are individually configured and correlated with respect to each other so as to attain the desired objective.

First provided is a wooden base 14. The base has an upper horizontal surface 16. The upper surface has a plurality of cylindrical base holes 18. Each of the base holes has a common diameter. Each of the base holes has a common axial length. Each of the base holes has an interior closed end 20. Each of the base holes terminates at the interior closed end 20. The base holes are evenly spaced. The base holes are provided in a linear array.

A wooden hand rail 24 is provided. The hand rail has a lower horizontal surface 26. The lower surface has a plurality of cylindrical rail holes 28. Each of the rail holes has a common diameter. The diameter of each of the rail holes is equal to the diameters of the base holes. Each of the rail holes has a common axial length. The length of each of the rail holes is equal to the axial lengths of the base holes. Each rail hole has an interior base closed end 30. Each of the rail holes terminates at the interior base closed end. The rail holes are evenly spaced. The spacing of the rail holes is equal to the spacing of the base holes. The rail holes are provided in a linear array. The hand rail is constructed of similarly configured segments 32, 34. The hand rail has end faces 36. The end faces are provided in facing contact. Each of the end faces has a face hole 38. Each of the face holes has a common diameter. The diameter of each of the face holes is equal to the diameters of the base holes and rail holes. Each of the face holes has a common axial length. The length of each of the face holes is equal to the axial lengths of the base holes and rail holes. Each face hole has an interior rail closed end 40. Each of the face holes terminates at the interior rail closed end.

Further provided is a plurality of similarly configured wooden vertical posts 44. Each of the posts has a common length. Each of the posts has a horizontal upper end 46. Each of the posts has a horizontal lower end 48. Each of the ends has a post hole 50. Each of the post holes have a common diameter. The diameter of each of the post holes is equal to the diameters in the base holes and the rail holes. Each of the post holes has a common axial length. The length of each of the post holes is equal to the axial lengths in the base holes and the rail holes. Each of the post holes has an interior closed end. Each of the post holes terminates at the interior closed end.

Provided last is a plurality of similarly configured coupling component assemblies 54. Each assembly includes a first coil spring 56. Each assembly includes a second coil spring 58. Each coil spring is positioned in a hole. Each coil spring has an interior end 60. The interior end of the each coil spring has a reduced diameter. Each coil spring has a nail 62. The nail attaches the spring to the hole. Each coil spring has an exterior end 64. The exterior end extends a short distance outside of the hole. The exterior ends of adjacent opposing coil springs are adapted to interlock and join associated components of the system when rotated with respect to each other about a common axis of rotation. The coupling components also include a cylindrical rod 66. The rod has opposed ends within the opposing coil springs. Each rod has an axial length. The length of each rod is greater than the length of each coil spring and less than the axial length of two holes.

Figures 5, 6:
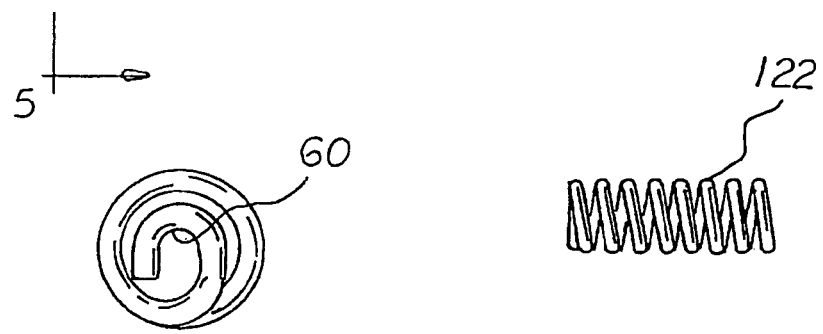
FIG. 5 is an end elevational view of the spring taken at line 5-5 of FIG. 4.
FIG. 6 is an enlarged front elevational view of a coil spring constructed in accordance with an alternate embodiment of the invention.
Figure 7:
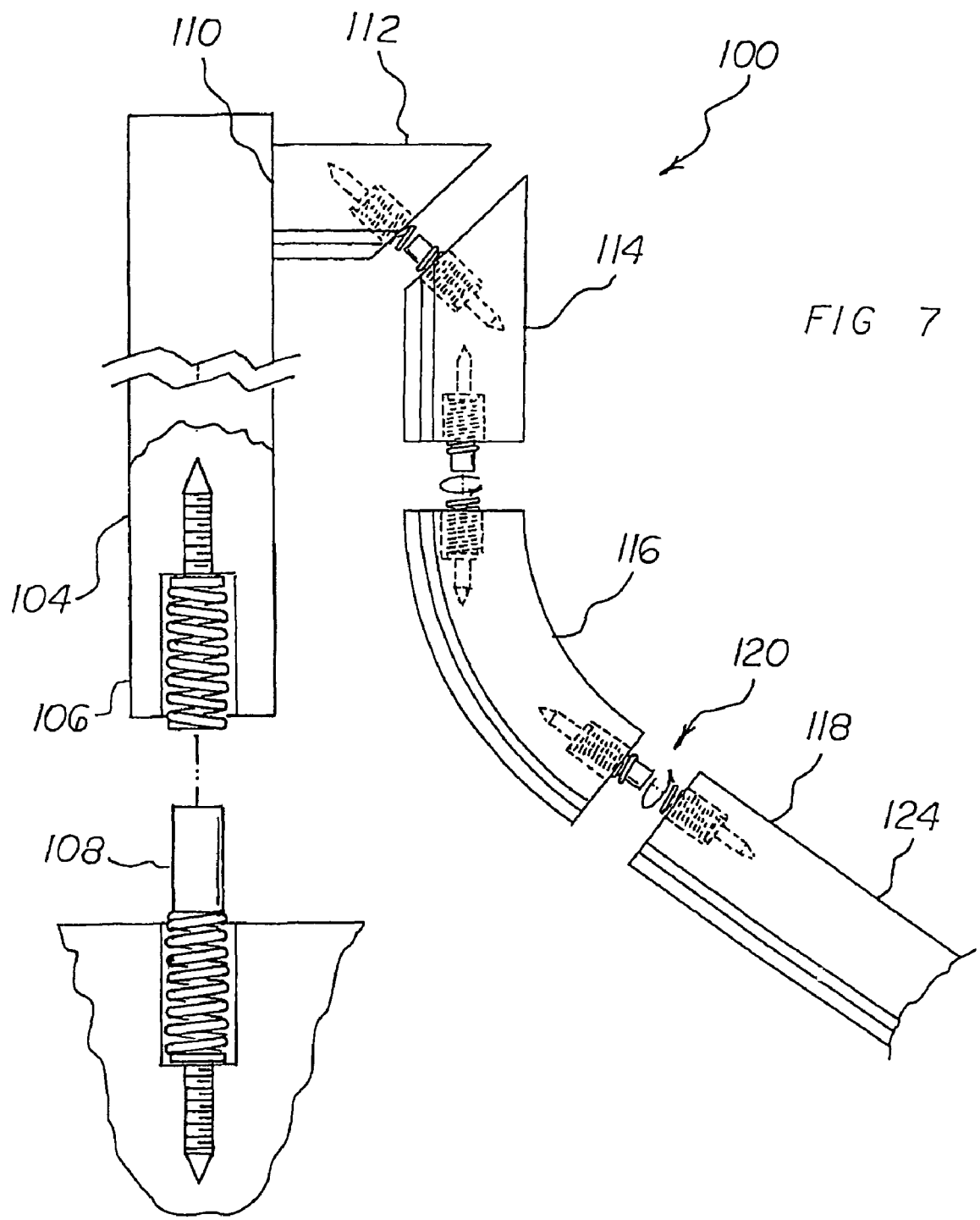
FIG. 7 is an elevational view of a post coupling system constructed in accordance with an alternate embodiment of the invention, the rail being a front elevational view, the post being rotated 90 degrees.

Reference is now made to the alternate embodiment 100 in FIGS. 6 and 7. A post 104 is provided. The post has a lower end 106. A coupling component assembly 108 is provided. The coupling component assembly extends into a horizontal base. A hand rail is provided. The post has an upper end 110. The post has a lateral extent. The lateral extent is coupled to the hand rail. The hand rail has a plurality of rail sections 112, 114, 116, 118. The rail sections are chosen from the class of rail sections. The class of rail sections includes a horizontal section, an angled end 112, a vertical section with an angled end 114, an arcuate section 116 and an angular extending section 118. The rail sections are joined by coupling component assemblies 12. The coupling components include springs of a reduced size.

Following are instructions for installing the post hardware in accordance with the present invention:
1. Cut a ⅛ inch thick slice form the post that is to be installed.
2. Mark one face of the ⅛ inch slice with an "X".
3. With the mark facing you, align the ⅛ inch slice to the bottom of the post you are about to install.
4. Mark a spot on the ⅛ inch slice as close to center as you can and with a 1⅜ inch paddle bit drill the pilot tip of the bit into the ⅛ inch slide on that center mark until the point of the bit has marked the surface of the post you are about to make.
5. Remove the ⅛ inch slice from the bottom of the post you have just drilled. With the mark faced away from you, locate the ⅛ inch slide on the floor. With the point of the 1⅜ inch bit drill in the same hole in the ⅛ inch slice, mark the floor.
6. Using the marks made by the tip of the paddle bit, drill a 3 inch deep hole into the face of both faces to be joined.
7. Screw one spring into each hole. It is important that both springs are screwed tight to the bottom of the hole.
8. At this point, there are several options:
   A. To make the joint permanent, you should butter the steel pin with the epoxy of your choice and insert same into the spring you screwed into the floor. Apply the wood glue of your choice to face of both surfaces to be joined. Align the two springs and engage the two springs. Twist until you have enough tension on the springs to keep the joint in compression while the glue and epoxy have set. Before the glue and epoxy set you can plumb the post by sliding pre-glued shims into the spring loaded joint.
   B. To make the joint temporary omit the epoxy and glue. A post set without epoxy and glue is an unsafe condition. It is recommended that temporary installs be red flagged and that the post be properly braced.

It is the responsibility of the user to insure that all attachments meet local building code requirements.

The following are instructions for installation of rail hardware in accordance with the present invention:
1. Cut a ⅛ inch thick slice from one of the pieces you are about to join.
2. Mark one face of the ⅛ inch slice with an "X".
3. With the mark facing you, align the ⅛ inch slice on one face of the joint you are about to make.
4. Pick a location anywhere on the ⅛ inch slice that works for you and with a ⅝ inch paddle bit drill the pilot tip into the ⅛ inch slice until the point of the bit has marked the surface of the joint you are about to make.
5. Remove the ⅛ inch slice from the surface that you have just drilled. With the ?X? mark faced away from you, align the ⅛ inch slice on the face of the other surface you are about to joint. With the point of the ⅝ inch bit mark the second or other surface to be joined.
6. Using the marks made by the tip of the paddle bit, drill a 1 inch deep hole into the face of both faces to be joined.
7. Screw one spring into each hole. It is important that both springs are screwed tight to the bottom of the hole.
8. At this point you have several options.
   A. To make the joint permanent you can butter the steel pin with the epoxy of your choice and insert same into either spring. Apply the wood glue of your choice to face of both surfaces to be joined. Align the two springs and engage the two springs. Twist until you have enough tension on the springs to keep the joint in compression while the glue and epoxy have set.
   B. To make the joint temporary omit the epoxy and glue. You can tack the joint with a drop of glue on one face and twist the two pieces together with enough spring pressure so you can prefit and blend the joint. A strong tap on the joint will break the joint and allow you to unscrew same.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A coupling system comprising:
   a plurality of wooden vertical posts, each of the posts having a common length with a horizontal upper end and a horizontal lower end, each of the ends having a post hole, each of the post holes having a common diameter and a common axial length and terminating with an interior closed end, the posts adapted to couple with rail holes each having an axial length in a rail above or to couple with base holes each having an axial length in a base below; and a plurality of coupling component assemblies, each assembly comprising:

a cylindrical rod with opposed ends;

first and second coil springs, each disposed at a respective one of the opposed ends of the cylindrical rod such that the cylindrical rod is coaxially received within the first and second coil springs, each coil spring having an exterior end fixed to the cylindrical rod, and an interior end of a reduced diameter;

a first fastener coaxially received within the interior end of the first coil spring and extending therefrom; and a second fastener coaxially received within the interior end of the second coil spring and extending therefrom;

the rod having an axial length greater than the length of each coil spring and less than the axial length of each respective post hole, rail hole or base hole;

wherein the first coil spring is positioned within and attached within the post hole of a respective one of the plurality of posts by the first fastener, the second coil spring is positionable within and fastenable within a respective rail hole or base hole by the second fastener such that the exterior end of each coil spring extends a short distance outside of the respective post hole, rail hole or base hole; and wherein exterior end of adjacent opposing coil springs disposed at the opposing upper and lower ends for each post are adapted to rotatably interlock and join the plurality of posts with the rail or base when rotated with respect to each other about a common axis of rotation.

2. A coupling system comprising:

a plurality of wooden vertical posts, each of the posts having a common length with an upper end and a lower end, each of the ends having a post hole, each of the post holes having a common diameter and a common axial length and terminating with an interior closed end, the posts adapted to couple with rail holes each having an axial length in a rail above or to couple with base holes each having an axial length in a base below; and a plurality of coupling component assemblies, each assembly comprising:

a cylindrical rod with opposed ends;

first and second coil springs, each disposed at a respective one of the opposed ends of the cylindrical rod such that the cylindrical rod is coaxially received within the first and second coil springs, each coil spring having an exterior end fixed to the cylindrical rod, and an interior end of a reduced diameter;

a first fastener coaxially received within the interior end of the first coil spring and extending therefrom; and a second fastener coaxially received within the interior end of the second coil spring and extending therefrom;

the rod having an axial length greater than the length of each coil spring and less than the axial length of each respective post hole, rail hole or base hole;

wherein the first coil spring is positioned within and attached within the post hole of a respective one of the plurality of posts by the first fastener, the second coil spring is positionable within and fastenable within a respective rail hole or base hole by the second fastener such that the exterior end of each coil spring extends a short distance outside of the respective post hole, rail hole or base hole; and wherein exterior end of adjacent opposing coil springs disposed at the opposing upper and lower ends for each post are adapted to rotatably interlock and join the plurality of posts with the rail or base when rotated with respect to each other about a common axis of rotation.

3. A coupling system comprising:

a plurality of wooden vertical posts, each of the posts having a common length with an upper end and a lower end, each of the ends having a post hole, each of the post holes having a common diameter and a common axial length and terminating with an interior closed end, the posts adapted to couple with rail holes each having an axial length in a rail above or to couple with base holes each having an axial length in a base below;

a base having a plurality of holes;

a hand rail having a plurality of holes;

a plurality of coupling component assemblies, each assembly comprising:

a cylindrical rod with opposed ends;

first and second coil springs, each disposed at a respective one of the opposed ends of the cylindrical rod such that the cylindrical rod is coaxially received within the first and second coil springs, each coil spring having an exterior end fixed to the cylindrical rod, and an interior end of a reduced diameter;

a first fastener coaxially received within the interior end of the first coil spring and extending therefrom; and a second fastener coaxially received within the interior end of the second coil spring and extending therefrom;

the rod having an axial length greater than the length of each coil spring and less than the axial length of each respective post hole, rail hole or base hole;

wherein the first coil spring is positioned within and attached within the post hole of a respective one of the plurality of posts by the first fastener, the second coil spring is positioned within and fastened within a respective rail hole or base hole by the second fastener such that the exterior end of each coil spring extends a short distance outside of the respective post hole, rail hole or base hole; and wherein exterior end of adjacent opposing coil springs disposed at the opposing upper and lower ends for each post are adapted to rotatably interlock and join the plurality of posts with the rail or base when rotated with respect to each other about a common axis of rotation.

* * * * *